United States Patent [19]

Al Ghatta et al.

[11] Patent Number: 5,696,208
[45] Date of Patent: Dec. 9, 1997

[54] POLYAMIDE RESINS WITH IMPROVED RHEOLOGICAL PROPERTIES

[75] Inventors: Hussain Ali Kashif Al Ghatta, Fiuggi; Sandro Cobror, Naples, both of Italy

[73] Assignee: Sinco Engineering S.p.A., Italy

[21] Appl. No.: 569,216

[22] PCT Filed: Apr. 20, 1995

[86] PCT No.: PCT/EP95/01498

§ 371 Date: Dec. 18, 1995

§ 102(e) Date: Dec. 18, 1995

[87] PCT Pub. No.: WO95/30704

PCT Pub. Date: Nov. 16, 1995

[30] Foreign Application Priority Data

May 5, 1994 [IT] Italy ............................ MI94A0871

[51] Int. Cl.[6] ................................................ C08L 77/00
[52] U.S. Cl. ................................ 525/425; 525/420
[58] Field of Search .............................. 525/425, 420

[56] References Cited

U.S. PATENT DOCUMENTS

| | | | |
|---|---|---|---|
| 4,876,127 | 10/1989 | Khanna | 428/35.7 |
| 5,254,620 | 10/1993 | Goetz et al. | |
| 5,403,896 | 4/1995 | Khanna | 525/420 |
| 5,468,530 | 11/1995 | Gotz | 428/36.4 |

FOREIGN PATENT DOCUMENTS

| | | |
|---|---|---|
| 0 084 643 | 8/1983 | European Pat. Off. |
| 0 490 155 | 6/1992 | European Pat. Off. |
| 1272660 | 10/1989 | Japan. |

OTHER PUBLICATIONS

Patent Abstracts of Japan: (JP,A,60 248 730) vol. 010, No. 123 (C–344), May 8, 1986.

Patent Abstracts of Japan: (JP,A,60 248 731) vol. 010, No. 123 (C–344), May 8, 1986.

Patent Abstracts of Japan: (JP,A,01 272 660) vol. 014, No. 037 (C–680), Jan. 24, 1990.

Abstract: Database WPI, Section Ch, Derwent Publications Ltd, London, GB; class A24, An 71–66091S (JP,B,46 035 337).

*Primary Examiner*—Patricia A. Short
*Attorney, Agent, or Firm*—Edward D. Manzo; Mark J. Murphy

[57] ABSTRACT

Polyamide resins characterized in melt state by high sensitivity to shear forces and high visco-elasticity, obtained by polycondensation/polyaddition in the solid state in presence of polyfunctional compounds capable of reacting with resin terminal groups and/or in presence of polyester resins employed in quantity up to about 40% by weight of the resin mixtures.

10 Claims, No Drawings

POLYAMIDE RESINS WITH IMPROVED RHEOLOGICAL PROPERTIES

BACKGROUND OF THE INVENTION

The present invention is directed to polyamide resins with improved rheological characteristics.

The polyamides of poly—ε—caprolactam and polyhexamethylene adipamide are resins which have found wide application in many sectors. In general they combine high strength and rigidity with good resistance to heat and abrasion. They are also characterized by resistance to chemical agents and flame. These resins do not, however, have satisfying rheological properties, for application in fields which require high dynamic viscosity of melt in the absence of shear forces, and lower viscosity when subjected to these forces. Due to this low sensitivity to shear forces (shear sensitivity) these polyamide resins are not processable, for example, by extrusion blow moulding processes.

In a previous patent application not yet published, Applicants have described alloys of polyester resins with polyamide resins, obtained by mixing the resins in melt state in the presence of a dianhydride of tetracarboxylic acid, preferably pyromellitic dianhydride, and subjecting the mixture to a polyaddition reaction in the solid state. The alloys obtained possess excellent mechanical characteristics. The content of polyamide resin is not more than 60% by weight. Essentially the alloys are formed of polyester resin modified with minor proportions of polyamide resin.

U.S. Pat No. 5,254,620 describes polyamide resins, modified with a minor percentage (0.5–5% by weight) of an elastomeric polyester resin obtained from high molecular weight polyoxyalkylene glycols, from low molecular weight glycols and from aromatic bicarboxylic acids. The addition of the elastomeric polyester resin improves the flow characteristics of polyamide, and also the flame resistance.

European patent application A 143 875 describes polyester resins with improved impact resistance characteristics, obtained by mixing the polyester resin with a polyamide-ester resin in quantity of 3 to 40% in weight and subjecting the mixture to heating at temperature from 15° to 60° C. lower than melting point of the polyester.

Japanese patent application 1272660 describes compositions of polyamide resins and polyester resins in quantities respectively from 5 to 95% by weight, containing a dianhydride of tetracarboxylic acid, preferably pyromellitic anhydride or the anhydride of 3,3', 4,4'-biphenyltetracarboxylic acid. The compositions are characterised by low absorption of water, and good mechanical properties.

Japanese patent application 46/035 377 describes blends of polyamide resin and polyester obtained by reaction of a polyamide resin, having both carboxylic terminal groups. The mixtures are suitable for the preparation of fibres.

SUMMARY OF THE INVENTION AND DETAILED DESCRIPTION OF THE PREFERRED EMBODIMENTS

Unexpectedly it has now been found that it is possible to obtain modified polyamide resins having improved rheological properties in the melt state (higher dynamic viscosity and viscoelasticity) by subjecting to a solid state polycondensation or polyaddition treatment, at temperatures lower than resin melting point and higher than approx. 150° C., a mixture of the resin with a substance selected among:

a) a polyfunctional compound with groups capable of condensation or addition reaction with the $NH_2$ terminal groups of the polyamide resin;

b) a polyester resin in quantity up to about 40% in weight of the polyester and polyamide resin mixture.

The treatment in the solid state is prolonged until the shear sensitivity index of resin is increased by at least 3 times with respect to the value of the starting resin.

Shear sensitivity (Is) is the difference, divided by 100 rad/sec, between the dynamic viscosities in the melt (η' expressed in poises) measured with a flat-cone rheometer RHEOMETRICS RMS 800 respectively with a deformation frequence of 1–100 rad/sec and with deformation of 0.04 rad for each oscillation, operating at 270° C. under nitrogen and employing distance between plate and cone of 50 micron. The index value is approx. 100 poises per rad/sec in the case of nylon 6, while it is higher than at least 300 poises per rad/sec, and can reach values as high as 600–800 and more poises per rad/sec in the case of the polyamides of the present invention.

Another rheological property characteristic of a melted polymer is the elastic component G' (expressed in dine/$cm^2$) which in the case of the polyamide resins of the present invention arrives at values more than twice as high as those of the starting resin. In the case of the elastic component G' of nylon 6, modified according to the present invention, the difference, divided by 100 rad/sec, between the value of G', measured under the conditions indicated above for the melt viscosity, in correspondence of a deformation frequency of respectively 1 and 100 rad/sec, is at least 5000 and can reach 10 000 and more dine/$cm^2$ per rad/sec, in the case instead of nylon 6 as such the difference is lower than about 2500 dine/$cm^2$ per rad/sec. This difference can be considered as an index (Iv) of the melt viscoelasticity response to the shear deformations.

The thermal treatment of the resin in the solid state is carried out preferably in continuous operation reactors in which the resin in granules is fed upstream with an inert gas such as nitrogen, carbonic anhydride. The temperature is preferably selected between 170° and 210° C. The residence time is in relation to the desired increase in rheological properties.

The polyamides utilizable in the process of the invention are the product of polycondensation of a saturated bicarboxylic acid with 4 or 12 atoms of carbon with a diamine with 4–14 carbon atoms or polycondensation of an amino acid or polyaddition of a lactam. Examples of polyamides are polyhexamethylene adipamide, polyhexamethylene azelaidamide, polyhexamethylene sebacamide, polyhexamethylene dodecamide, polytetramethylene adipamide and the polyamides obtained from ring opening of lactams such as polycaprolactam and polylaurolactam. Particular preference is given to nylon 6, nylon 6,6, nylon 8, nylon 11 and nylon 12.

Included in the definition of polyamide resins are also the high melting point polyamides, such as copolyamides of ε—caprolactam, hexamethylene diamine and terephthalic acid or tetramethylene diamine with adipic acid.

The polyamides have in general an average ponderal molecular weight above 10 000 and generally between 20 000 and 60 000.

The polyester resins utilized are comprised of the polycondensation products of a diol with 2–12 carbon atoms with an aromatic bicarboxylic acid such as terephthalic acid, isophthalic acid, 1,5 or 2,6 or either 2,7 naphthalene bicarboxylic acids and mixtures thereof. Also included in the definition are elastomeric copolyesters comprising in the chain blocks deriving from polyalkylene glycols with molecular weight between 400 and 4000 and blocks deriving from diols with molecular weight lower than 250.

The molecular weights herein cited are average numeral molecular weights. Polyester resins comprised of the polycondensation product of a diol with 2.-12 carbon atoms with an aliphatic bicarboxylic acid such as adipic, suberic, and glutaric acids are also utilizable.

The preferred polyester resins are polyethylene terephthalate, polybutylene terephthalate, polyethylene naphthalenates, polyethylene terephthalate copolymers in which up to approx. 25% of the units deriving from terephthalic acid are substituted by units deriving from isophthalic acid. The intrinsic viscosity is preferably higher than 0.5 dl/g and generally between 0.6 and 1.8 dl/g (the viscosity is measured in a solution of 60/40 by weight of phenol and tetrachloroethane operating according to ASTM D-4603-86).

The polyester resins are terminated with OH and COOH groups.

As already indicated, the polyester resin is employed in quantities up to about 40% by weight of the mixture, preferably in quantifies from 5 to 20% by weight.

The polyfunctional compounds are preferably selected from the dianhydrides of aromatic tetracarboxylic acids. Pyromellitic dianhydride is the preferred compound. Examples of other utilizable dianhydrides are the dianhydrides of acids 3,3'4,4'tetracarboxy-diphenyl, bis (3,4-dicarboxy-phenyl) ether 3,3'4,4'-tetracarboxy-acetophenone, bis (3,4 dicarboxy-phenyl) sulphoxide, bisphenol A bis ether dianhydride. Other polyfunctional compounds particularly suitable are the 1,3-phenylene bis 2-oxazoline and its alkyl derivatives substituted in the benzene ring.

The polyfunctional compounds are employed in quantities from 0.05 to 2% by weight, preferably from 0.2 to 1% by weight.

The mixing of the polyamide resin with the polyfunctional compound or with the polyester resin is preferably carried out in twin screw co-rotating or counter-rotating intermeshing or non-intermeshing extruders at temperatures between about 200° aud 350° C. depending on the polyamide resin melting point. Counter rotating and intermeshing extruders are preferred. Residence times in the extruder range in general from 10 to 120 sec. and preferably between 15–30 sec. In order to avoid concentrations localized of the additive, it is convenient to dilute the additive with a granulated polyester resin (for example one part additive for 10 parts resin).

As already indicated, the polyamide resins of the present invention, because of their favourable rheological properties in the melt state, the in particular because of their high sensitivity to shear forces, and viscoelastic properties, are particularly suitable for extrusion blow moulding, for the preparation of foamed materials, tubular film and similarly shaped articles. The resins also possess excellent mechanical properties which make them adaptable to applications as technopolymers and to the preparation of fibres and films.

The resins of the present invention can also contain the additives normally employed in the sector such as stabilizers, UV absorbers, dyestuff and pigments, mould releasing agents, rein-forcing fillers, nucleating agents, plasticisers.

The following examples are given to illustrate the invention and are not limiting.

EXAMPLE 1

2 Kg/h of nylon 6 with melting point 223° C. are continuously fed to a conic twin screw counter-rotating extruder of length 340 mm equipped with a device for degasing.

Oxazoline (1,3-phenylene-bis 2-oxazoline) in powder is fed continuously to the extruder employing appropriate dosing equipment.

The mixing conditions are the following:

oxazoline=0.5% by weight average residence time=18-23 sec.

cylinder temperature=260° C.

melt temperature=265° C.

A one-hone mould is employed for extrusion (diameter of the hole=2 mm). The "spaghetto" obtained is cooled in water and palletized.

Part of the granules are then treated at 190° C. under nitrogen for 6 hours in a stirred reactor.

Samples of the resin thus obtained are subjected to determination of dynamic viscosity of melt and elastic component G' using a flat cone rheometer, a Rheometrics RMS 800, operating at 250° C. under nitrogen at deformation interval frequency of 1 to 100 rad/sec and deformation of 0.04 rad for each oscillation. The distance between plate and cone is 50 micron.

The samples were dried at 100°–105° C. under vacuum for at least 12 hours before measurement.

Measurements were also carded out on samples not subjected to thermal treatment.

Values for complex viscosity and elastic component G' are reported in Table 1.

In Table 1, the mechanical properties determined on a cast film, using an INSTRON tensile tester (mod. 4505) operating according to ASTM D-882, for the tensile strength and determining the elastic modulus from the initial slope of stress-strain curve are also reported.

EXAMPLE 2

The conditions of Example 1 have been repeated employing polyethylene terephthalate (PET) in granules with an intrinsic viscosity=0.63 dl/g in a quantity 10% by weight on the mixture, in place of oxazoline. The temperature of the cylinder was 170° C. and that of the melt 280° C.

The PET used was obtained from terephthalic acid employing antimony oxide as catalyst; no cobalt compounds and no trasesterification catalyst were employed.

The theological measurements were carried out at 270° C. The results are reported in Table 1 where the mechanical properties of a cast film are also reported.

EXAMPLE 3

The conditions of Example 2 were repeated employing the PET of example 2 mixed with 0.3% by weight of pyromellitic dianhydride (PMDA).

The quantity of PET/PMDA was 10% by weight on the mixture.

The temperature of the cylinder was 270° C. and that of the melt 280° C.

The rheological measurement results carried out at 270° C. and the mechanical property data are reported in Table 1. Data relative to the measurements of Nylon 6 are also reported in Table 1.

TABLE 1

| Samples | Examples 1 | Examples 2 | Examples 3 | Nylon 6 |
|---|---|---|---|---|
| Granules before thermal treatment | | | | |
| Viscosity η' (P) | | | | |
| ω = 1 rad/sec | 22 300 | 13 000 | 16 100 | 8 500 |
| 100 rad/sec | 9 900 | 5 750 | 5 500 | 5 500 |
| Modulus G' (dine/cm$^2$) | | | | |
| ω = 1 rad/sec | 1 700 | 1 300 | 1 900 | 1 990 |
| 100 rad/sec | 541 000 | 274 000 | 316 000 | 203 450 |
| Granules after thermal treatment | | | | |
| Viscosity η' (P) | | | | |
| ω = 1 rad/sec | 51 500 | 82 000 | 65 750 | 17 300 |
| 100 rad/sec | 13 400 | 12 600 | 10 700 | 8 050 |
| Modulus G' (dine/cm$^2$) | | | | |
| ω = 1 rad/sec | 9 800 | 36 150 | 2 100 | 1 500 |
| 100 rad/sec | 982 900 | 1 092 000 | 888 150 | 397 000 |
| Film before thermal treatment | | | | |
| Modulus (MPa) | 864 | — | 817 | 721 |
| Extensibility (%) | 300 | — | 287 | 232 |
| Tensile strenght (MPa) | 73 | — | 73 | 52 |
| Film after thermal treatment | | | | |
| Modulus (MPa) | 997 | 1033 | 1082 | 806 |
| Extensibility (%) | 275 | 271 | 208 | 1252 |
| Tensile strenght (MPa) | 69 | 81 | 83 | 71 |

We claim:

1. A polyamide resin having a sensitivity index to shear forces in melt state higher than 200 poises/rad/sec and a viscosity index higher than 5000 dine/cm$^2$ per rad/sec, obtained by a solid state polyaddition of a polyamide resin in the presence of a polyfunctional compound capable of addition reactions with resin terminal groups, the polyfunctional compound being selected from the group consisting of dianhydrides of aromatic tetracarboxylic acids and oxazolines, in an amount from 0.05 to 2% by weight.

2. A polyamide resin according to claim 1 wherein the solid state polyaddition is carried out at a temperature lower than the melting point of the polyamide resin and superior to 150° C.

3. A polyamide resin according to claim 1 wherein the polyamide resin is selected from the group comprising Nylon 6, Nylon 6.6, Nylon 11 and Nylon 12.

4. Formed articles obtained from the polyamide resin of claim 1.

5. A polyamide resin according to claim 1 wherein the polyfunctional compound is pyromellitic dianhydride.

6. Resins according to claim 5 in which the solid state polyaddition is carried out at a temperature lower than the melting point of the polyamide resin and superior to 150° C.

7. A polyamide resin according to claim 5 wherein the polyamide resin is selected from the group comprising Nylon 6, Nylon 6.6, Nylon 11 and Nylon 12.

8. Formed articles obtained from the polyamide resin of claim 5.

9. A polyamide resin having a sensitivity index to shear forces in the melt state higher than 200 poises/rad/sec and viscoelasticity index higher than 5000 dine/cm$^2$ per rad/sec, obtained by a solid state polycondensation of a polyamide resin having an average ponderal molecular weight from 10,000 to 60,000 mixed with a polyester resin in a quantity from 5 to 40% by weight and selected from the group comprising polyethylene terephthalate, polybutylene terephthalate, polyethylene napthalenates, and polyethylene terephthalate copolymers in which up to approximately 25% of the units deriving from terephthalic acid are substituted by units deriving from isophthalic acid.

10. A resins according to claim 9 wherein the polyester resin is polyethylene terephthalate.

* * * * *